Dec. 4, 1934. H. F. FLOWERS 1,983,280
DUMP VEHICLE HAVING A FLUID MEDIUM DOOR CONTROL
Filed Nov. 3, 1931 10 Sheets-Sheet 1

Inventor,
Henry Fort Flowers.
By
Attorneys.

Dec. 4, 1934. H. F. FLOWERS 1,983,280
DUMP VEHICLE HAVING A FLUID MEDIUM DOOR CONTROL
Filed Nov. 3, 1931 10 Sheets-Sheet 2

Inventor,
Henry Fort Flowers.

Dec. 4, 1934.                H. F. FLOWERS                1,983,280
            DUMP VEHICLE HAVING A FLUID MEDIUM DOOR CONTROL
                  Filed Nov. 3, 1931      10 Sheets-Sheet 4

Inventor,
Henry Ford Flowers.
By
Attorneys.

Dec. 4, 1934.  H. F. FLOWERS  1,983,280
DUMP VEHICLE HAVING A FLUID MEDIUM DOOR CONTROL
Filed Nov. 3, 1931  10 Sheets-Sheet 6

Inventor,
Henry Fort Flowers.
By
Attorneys.

Dec. 4, 1934.  H. F. FLOWERS  1,983,280
DUMP VEHICLE HAVING A FLUID MEDIUM DOOR CONTROL
Filed Nov. 3, 1931  10 Sheets-Sheet 9

Inventor,
Henry Fort Flowers.
By
Attorneys.

Patented Dec. 4, 1934

1,983,280

UNITED STATES PATENT OFFICE 1,983,280

DUMP VEHICLE HAVING A FLUID-MEDIUM DOOR CONTROL

Henry Fort Flowers, Findlay, Ohio

Application November 3, 1931, Serial No. 572,854

32 Claims. (Cl. 298—22)

This invention relates to dump vehicles, and more particularly concerns a dump vehicle in which the body may be tilted for dumping, and in which the door at which dumping is to occur may be operated independently of the tilting movement of the body.

One of the features of the present invention is the provision of a dump vehicle in which the tilting movement of the body and the opening movement of the door are independent of one another, so that the door may be opened prior to the tilting of the body, during the tilting, or after the tilting has been completed.

Another feature of the present invention is the provision of a structure by which the body may be tilted to either side or to the rear, in conjunction with three doors which may be selectively operated in the manner above noted.

A further feature of the invention is the provision of a dump body with door control means whereby the doors may all be brought to open position, regardless of the tilted position of the body, and maintained in such open position during subsequent tilting movements of the body.

Still another feature of the present invention is the provision of a dump vehicle of trailer type, in which the direction of tilting of the body and the selection and timing of the opening of the doors may be controlled from a tractor vehicle coupled to the trailer.

Another feature of the invention is a fluid-medium door control providing a positive opening and closing of the doors, but with permissive free movements when the associated door is stuck or blocked against movement, whereby to prevent breakage of parts.

Still further features of the invention will appear in the course of the following specification and claims, this specification showing an illustrative form of practicing the invention with a trailer vehicle of road type, but it will be understood that this example is not the sole form in which the invention may be used, but that it may be employed in many ways in the dump vehicle art.

In these drawings:—

In these drawings, the dump vehicle construction comprises a frame having a running gear, and a dump body with doors and door operating mechanism, and a source of fluid under pressure and control valves therefor. In the illustrated form, the vehicle frame members 10 are connected to the ground wheels W and the ground chains D of an endless traction type tread, and the vehicle is intended to operate as a trailer for a motor driven tractor upon which the source of fluid under pressure is provided; but it will be understood that this illustrated form is merely one type of embodiment, and that the invention is not limited solely thereto.

Figure 13:
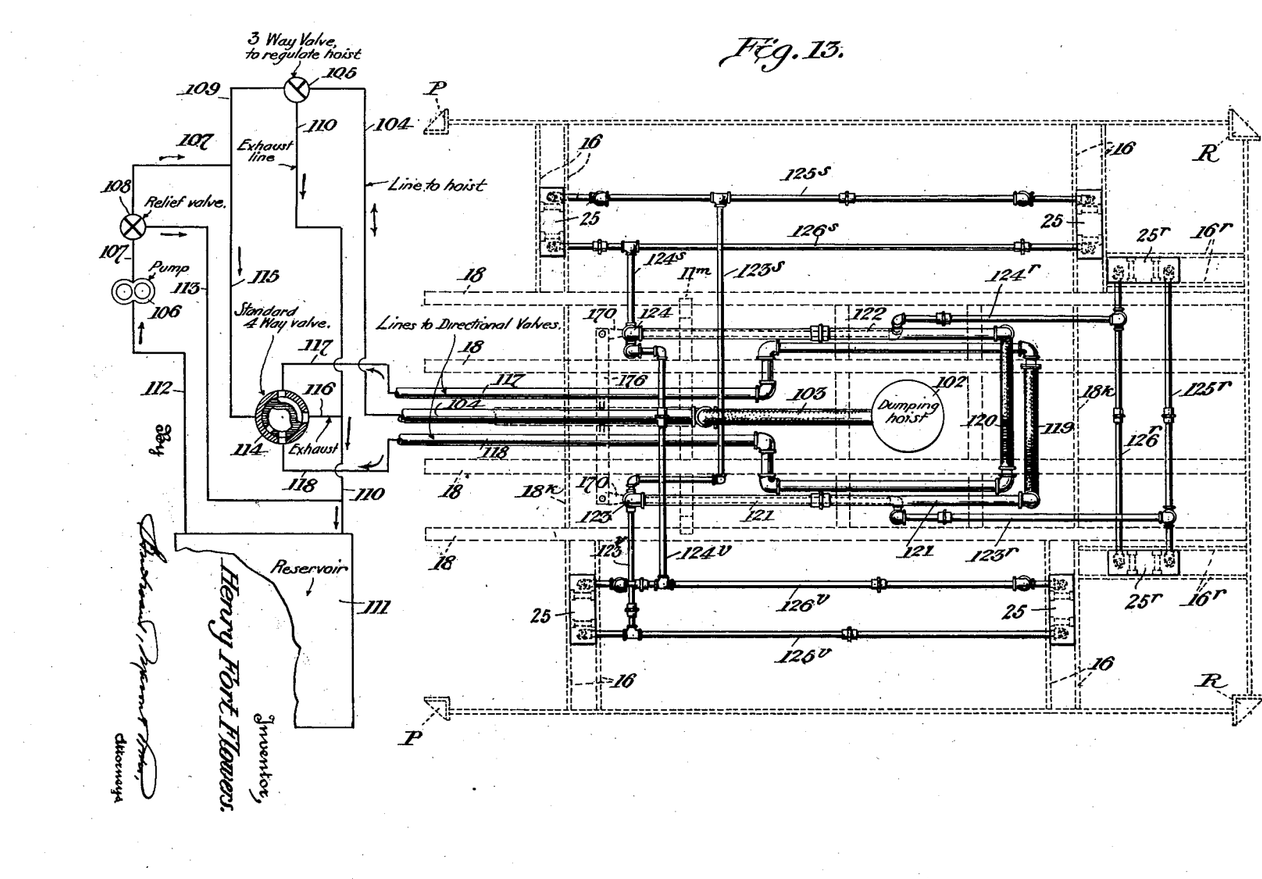
Figure 13 is a diagrammatic view, substantially in horizontal plan, showing the fluid pressure connections for operating the door control elements.

The sub-frame beams 11 are connected by the plates 10s and the pivots 13 to the rear of the frame members 10. Cross members 11a having the vertical stiffeners 11x connect the sub-frame beams 11 and are extended laterally as the brackets 11b having upturned ears at their ends to receive the pivot 14 for the frame-connected ends of the transverse arms T, Ta which are attached at their opposite ends (Figure 3) by pivots 15 to the downwardly extending gusset plates 16 which form a part of a stiffening system for the body 17, which likewise has the longitudinally extending stiffening beams 18 (Figures 2 and 13) thereon. The floor 17 is preferably curved over at the sides and rear end and extends downward as the skirts 19, 19r which may be connected by welding to corresponding angle irons 20, 20r. At the side, these angle irons 20 are secured to the stiffening plates 21 which run longitudinally beneath the edge of the body and are secured to the gusset plates
16. Near the front and back of the vehicle body, one gusset plate 16 at each side is continued across the vehicle, as a body stiffening member 18k (Figure 13). It will be noted that the other gusset plate 16 in a pair on the right side of the vehicle is not symmetrically opposite the corresponding pair on the left side, but is arranged on the opposite side of the stiffener 18k therefrom.

Between the gusset plates 16, 16r, the skirts 19, 19r, are cut away to receive the depending door arms and other parts as will be described hereinafter.

Figure 3:
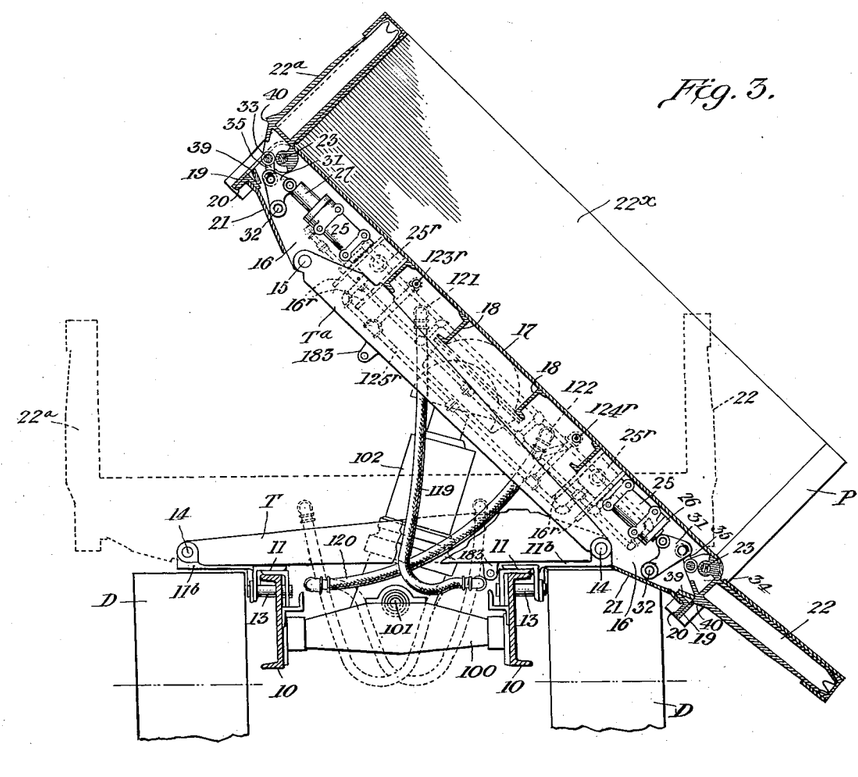
Figure 3 is a transverse section on a somewhat larger scale, showing in full lines the dump body and parts titled about a side fulcrum.

The side doors 22, 22a are mounted on pivots 23 so that they may swing down from closed to open position as respectively shown in dotted and full lines in Figure 3, for example. The rear door 22r may likewise swing about the pivots 23r.

As shown in Figures 1, 2, 3 and 13, corner posts P are provided at the front corners of the body, and posts R at the rear corners of the body. At these rear corners, the posts R are rigidly joined to the floor skirts 19, 19r and to the angle irons 20, 20r, and are formed of angle irons having brace pieces extended across their edges at the lower portion, but leaving the upper portion of the angle irons free for the engagement of the hooks 22h on the side doors which thus operate to prevent the rearward bending of the upper corners of the posts R due to pressure against the rear door. The rear posts R are preferably provided at their upper ends with the key hole slots 22s for engagement by the usual hook and chain for supporting the rear doors in open position whereby to relieve the lower door pivots of strain under such conditions.

Figure 8:
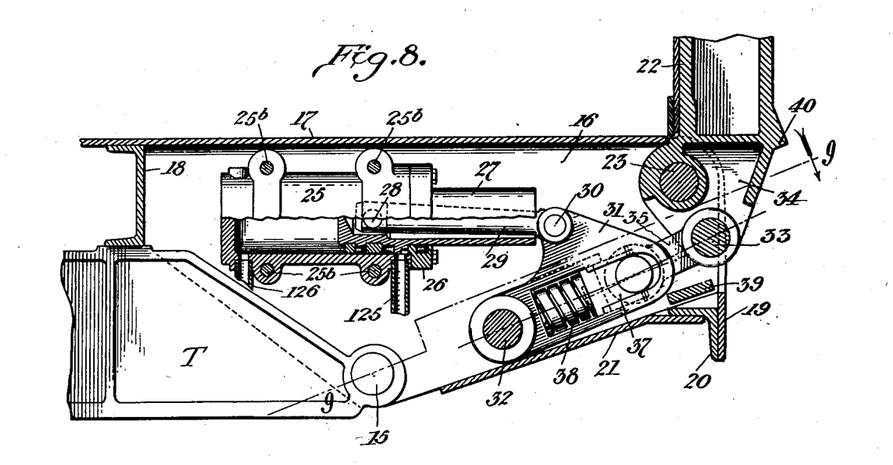
Figure 8 is a vertical transverse sectional view showing a slightly modified type of door control mechanism employed for a side door.
Figure 9:
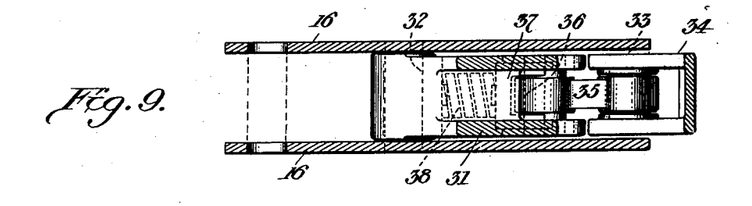
Figure 9 is a sectional view substantially on line 9—9 of Figure 8.
Figure 10:
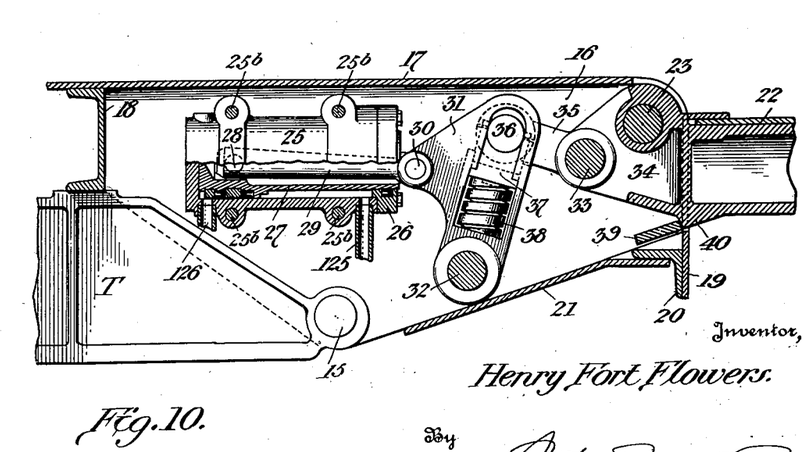
Figure 10 is a view corresponding to Figure 8, with the parts in another operated position.

In Figures 8, 9 and 10 it will be noted that the pairs of gusset plates 16 are spaced apart and between each pair is rigidly mounted by bolts 25a a cylinder 25 having a closing flange 26 and a plunger piston 27. The plunger piston is hollow and is connected by a pivot 28 to the piston link 29 which at its other end is connected by a pivot 30 to a crank lever 31 which is mounted on a pin 32 carried by the two gusset plates 16 (Figure 9).

A pivot 33 on the lower door extension 34 receives one end of a link 35 whose other end is provided with a pin 36 mounted in a slider 37 guided in the crank lever 31. The seating spring 38 tends constantly to force the pivot 36 away from the pivot 32.

Between the gusset plates 16 is a stop rail 39 to engage the ridge 40 on the outer surface of the door and thereby limit the opening movement of the door (Figure 10).

Between the pairs of rear gusset plates 16r are mounted the rear cylinders 25r having the hollow plunger pistons 27r therein and with the closing and stop flanges 26r (Figures 4, 5, 6, 10 and 11). The piston links 29r are pivotally connected by pins 28r to the plunger pistons, and by pins 30r to a crank lever 31r which is pivotally mounted by pin 32r to the gusset plate 16r. A pivot pin 45 supports the hook 46 which is constantly urged in a counterclockwise direction about the pivot by a torsion spring 47. A cavity in the crank lever 31r receives a plunger 48 having at its outer end a portion 49 in a radial plane of the plunger and a portion 50 forming a surface inclined thereon. A hole 51 through the plunger 48 receives stop pin 52 for limiting the movement of the plunger 48. The spring 53 operates between the plate 54 at the bottom of the cavity in the crank link 31r against the inner end of the flange 48. The position of the plate 54 may be regulated by the adjusting screw 55.

At the upper ends of the rear corner posts P are provided the hooks 56 for fitting over the outwardly extending pins 57 secured to the upper corners of the end door 22r. These pins 57 have enlarged ends 58 to prevent lateral movement of the end door and to prevent spreading of the posts P and the side doors at their upper rear corners. Latches 59 may be passed through apertures in hooks 56 and into the upper edge of the side doors to prevent withdrawal of the pins 57 when it is desired to swing the end door about its upper edge.

Figure 1:
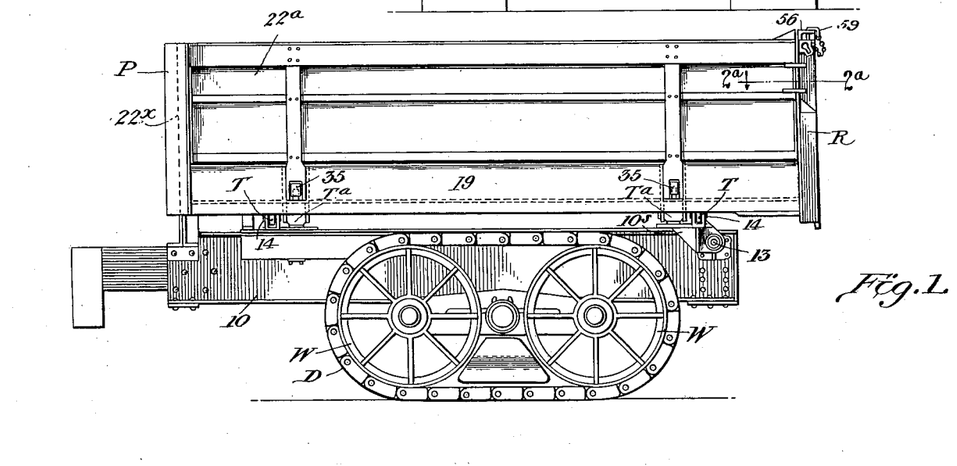
Figure 1 is a side elevation of a vehicle having a dump body mounted thereon for tilting in three directions, and doors for controlling the delivery of material in the three directions.
Figure 2:
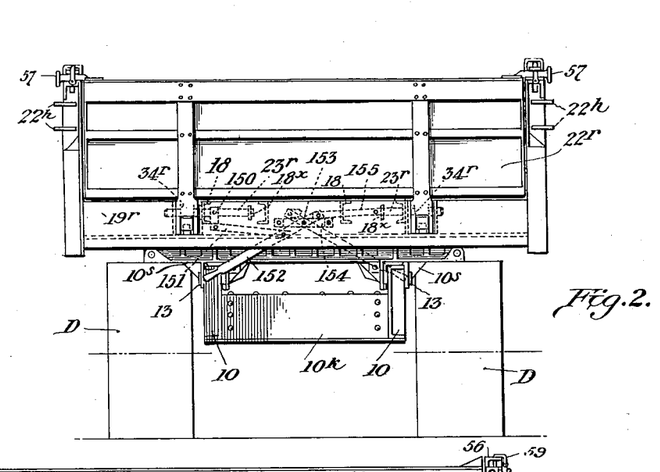
Figure 2 is an end elevation of the same.
Figure 2A:
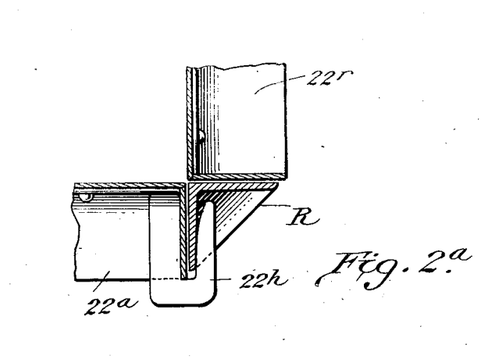
Figure 2a is a horizontal section, on a larger scale, substantially on line 2a—2a of Figure 1.

As shown in Figure 2, the rear door pivots 23r are mounted for lateral sliding movement in the body reinforcing channel irons 18 and the guide pieces 18x secured to the body bottom. The left-hand door pivot 23r (Figure 2) has an offset clamping piece 150 connected thereto, which is joined by a link 151 to the hand lever 152 which in turn is mounted by a pivot 153 on a strap 154 secured to the inner side of the body apron 19r. On the other side of the pivot 153, the lever 152 is connected by a link 155 to the right-hand door pivot 23r. Thus when the lever 152 is in the position shown in Figure 2, the door pivots 23r are engaged by body pieces 18, 18x and in the sleeves on the depending door arms 34r (position of Figures 6 and 12), while by moving the hand lever 152 in a counterclockwise direction to the position shown in dotted lines, the door pivots 23r are withdrawn from engagement with the depending door arm 34r, so that the door may swing about its upper pivot as described above.

Mounted on the transverse trunnioned member 100 on the frame members 10 (Figure 3), for example, by the longitudinal pivot 101 is a fluid pressure operated hoist cylinder 102 which is connected by a flexible hose line 103 (Figure 13) with the hoist pipe line 104 which may lead through suitable connections to the cab of the towing tractor in which is located a three-way hoist regulating valve 105 which is supplied, as shown in Figure 13, with fluid under pressure from a pump 106 through the main pressure line 107, past the automatic relief valve diagrammatically represented at 108 and by the hoist branch line 109: while the fluid may be exhausted from the hoist line 104, when the valve 105 is properly set, through exhaust line 110 back to a reservoir 111 when it is desired to recover the fluid being employed. Reservoir 111 is connected by the feed line 112 to the pump 106, while the relief valve 108 may discharge, at overpressure, by pipe line 113 back to the reservoir.

A dumping control valve 114 is connected by pipe 115 to the main pressure line 107, and by pipe line 116 to the exhaust pipe 110. It is also connected to the door-selecting valve pipes 117, 118 which pass through suitable connections to points beneath the body floor of the trailer and are provided, preferably adjacent pivots for rearward tilting of the body, with flexible hose connections 119, 120 to the pipe lines 121, 122 located closely beneath the body bottom and supported by the stiffening members thereof. The pipe lines 121, 122 communicate with the door-selecting valves 123, 124 which have the right hand and left hand branch pipes 123s, 123b, 124r, 124s leading therefrom to the right hand header pipes 125s, 126s, and to the left hand header pipes 125b, 126b; as well as the rearwardly extending branch pipes 123r, 124r extending to the rear header pipes 125r, 126r. The respective header pipes are connected to the hydraulic cylinders for operating the three directional doors.

It will be understood that the connections of pipe lines 104, 117, 118 between the tractor and the trailer are preferably accomplished through releasable connections of the type employed, for example, with train air brakes (not shown).

Figures 15, 16A, 16B, 16C, 16D, 17A, 17B, 17C, 17D:
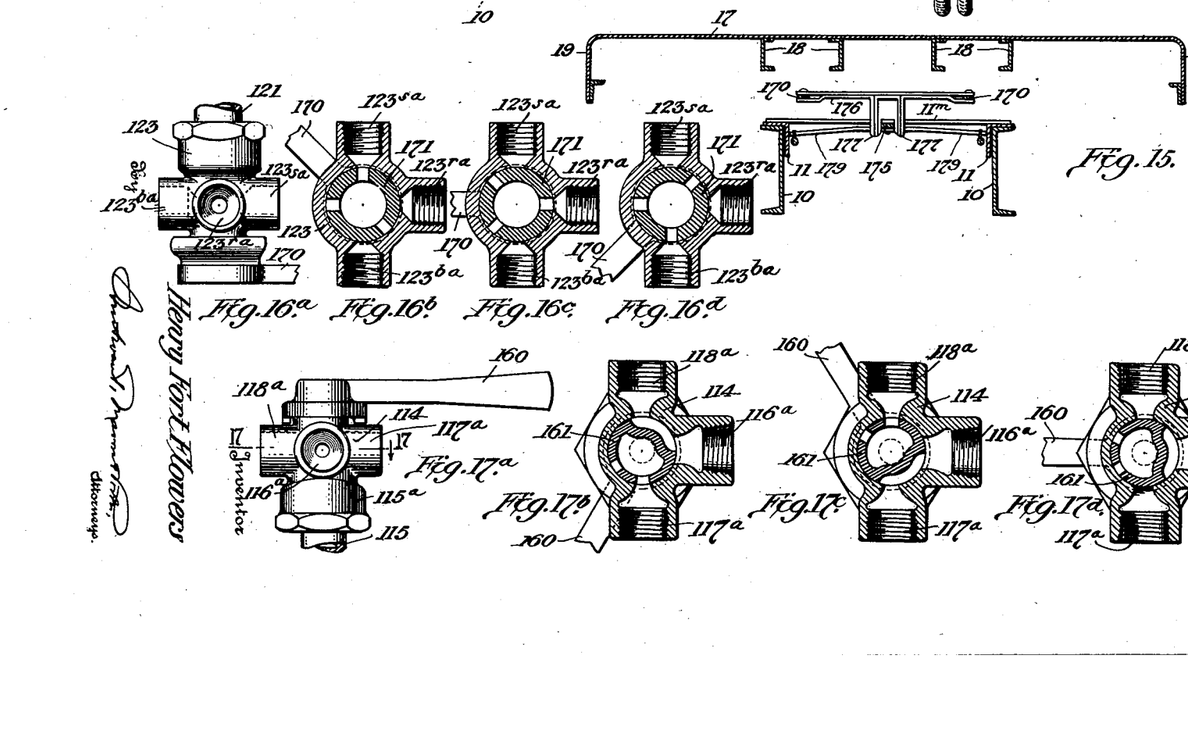
Figure 15 is a transverse sectional view showing the relationship of the vehicle frame, the body frame, and the latch element.
Figures 16a, 16b, 16c, and 16d show in elevation and three sections, the several positions of the hoist regulating valve.
Figures 17a, 17b, 17c and 17d correspondingly show in elevation and in three sections on line 17—17 of Figure 17a, the positions of the four-way direction control valve.

The four-way valve 114 is shown in elevation in Figure 17a as having a body and an operating handle 160 and the three pipe connections 116, 117 and 118 (Figure 13) located in a radial plane with respect to the center plug 161 (Figure 17b), while the inlet or supply connection 115 is located on the axis of the plug.

In operation, when the center plug 161 is in the position of Figure 17b, the fluid under pressure entering axially through pipe line 115 passes to the interior of the plug 161 and thence to pipe line 117, while a discharge connection is effected along the periphery of plug 161 between pipe line 118 and the line 116a leading to the exhaust main 110. Under such conditions, the fluid under pressure is employed to charge the pipe line 117 leading to the door-selecting valve 123, while the pipe line 118 leading to the door-selecting valve 124 is permitted to exhaust back to the reservoir 111. Since the door-selecting valve 124 is connected (Figure 13) by pipes 124s, 124v and 124r to the inner ends of the hydraulic units 25, 25r, it is obvious that when the door-selecting valve 124 is in one operative position, the corresponding pair of hydraulic units will be charged and actuated to produce the outward movement of their respective plunger pistons 27, 27r. At the same time, the door-selecting valve 123 will permit the exhaust of fluid from the outer end of the same units so that the pistons may move, through the pipe 123s, 123v, or 123r.

When the handle 160 is moved into the position of Figure 17c, the fluid supply pipe 115 through its connection to the inner chamber of the plug 161 causes the delivery of fluid into pipe line 118 and thus to door-selecting valve 124. At the same time, the pipe line 117 to door-selecting valve 123 is connected through the peripheral passage of the plug 161 to the exhaust line 116. Under these conditions, fluid under pressure is delivered to the other door-selecting valve, and hence the hydraulic units are caused to follow in the opposite direction.

With the handle 160 in the position of Figure 17d, the central plug 161 is in position to shut off all communication between the supply, exhaust and door-selecting valve lines so that no fluid may flow in any direction: and thus the hydraulic units are blocked in their traveling position.

It is thus apparent that by moving the handle 160 to the desired position, it is possible to operate the hydraulic units in any desired manner, to bring them to a standstill in any position, and to hold them locked, by fluid pressure, in any selected position.

The two door-selecting valves 123, 124 are identical in construction, and only one need be described in detail. In Figure 16a it is shown that the handle 170 is connected to the centrally rotatable plug 171 having a number of apertures through its wall and pipe and having in its body three pipe connections 123, 123sa, 123ra, 123va, to which are connected the pipes 123s, 123r, 123v of Figure 13. The chamber of the central plug 171 is connected to the axially entering pipe line 121 leading (Figure 13) to the door-selecting valve line 117.

The pipe line 123s is connected with the central chamber of the plug 171 and thus with pipe lines 121 and 117. When the handle 170 is in the position of Figure 16b, pipe lines 123r and 123v are then shut off, and no fluid may be transported to or from the corresponding hydraulic units from this door-selecting valve: while communication is established to pipe line 123s to the outer ends of the units. It will be understood that the door-selecting valve 124 is similarly connected to the pipe lines 124s, 124r and 124v and that the line 124s is connected to the door-selecting valve lines 122, 118; so that full connections are thus established from the four-way valve 114 through pipe lines 117, 121 and/or 118, 122 to the selected door-selecting valve 123, 124 and when the valve 124 is in the position of Figure 16b, fluid is delivered by pipe 124s from the inner ends of the pair of hydraulic units 25 or 25r, as a return connection back to the four-way valve 114. Thus according to the position of these door-selecting valves, one of the three gates is selected for opening and closing movement; and the direction of this movement, and the stopping of the gate may be controlled by the four-way valve 114. With the two valves in the position of Figure 16b, for example, and the door-selecting valve line 117 connected to the source of liquid under pressure while door-selecting valve line 118 is connected to the exhaust, pressure is transported through line 117, 121 to three-way valve 123 and thence by pipe 123s to the outer pressure manifold line 125s for the right-hand door (Figure 12) and thence to the pair of hydraulic units 25, which may be regarded as in the position of Figure 8. The plunger piston 23 is thus forced inward and the links 31, 35 collapsed, so that the corresponding door 22 is given an opening movement. At the same time, the door-selecting valve 124 is permitting the escape of fluid from the pipe line 126 at the inner end of the unit 25 (Figure 8) by the inner manifold pipe line 126s and pipe 124s to the pipe line 126, 122, 117 and thus back to the four-way valve 114 and thence by the exhaust and pipe 116 back to the reservoir.

If, without any change of the handle 170, the four-way valve 114 is moved from the position of Figure 17b into the position of Figure 17c, then the charging and discharging of the door-selecting valve lines 117, 118 will be reversed: and fluid under pressure will be admitted to the inner end of the cylinders, while fluid is permitted to discharge from the outer end of the cylinders. Thus the plunger piston 27 is moved from the position of Figure 10 back into the position of Figure 8 and therewith the door is closed.

When the door-selecting valve 123 is in the position of Figure 16c, the central chamber of plug 171 is connected with pipe line 123r leading to the pair of hydraulic units for operating the rear door: and thus by proper operation of the four-way valve 114 as described above, the rear door may be opened or closed as desired.

Similarly, when the handle 170 is in the position of Figure 16d, the central chamber of the plug 161 is connected to pipe line 123v and thus the hydraulic units for the left-hand door may be actuated, in similar manner, by control of the four-way valve 114. Further, it will be noted that if the door-selecting valves 123, 124 are, for example, set in the position of Figure 16b, and the four-way valve 114 operated to open the right-hand door, that it is possible to move the door-selecting valves 123, 124 into the position of Figure 16c, without change of the four-way valve 114 so that now the opening of the rear door occurs and this may be carried further by the movement of the handle 170 to the position of Figure 16d, in which the left hand door will be opened and left open to constitute a platform. By reversal of the position of the four-way valve 114, and the successive movement of the handle 170, the three doors may be returned to their closed position.

Further, by moving the handle 170 to a position intermediate the positions of Figures 16b, 16c, or a position intermediate those of Figures 16c, 16d, the ports in the wall of the central plug 171 may be brought against blank portions of the body 123, and thus all movement of fluid to any pipe 123s, 123r, 123v is interdicted and the doors are held in closed position by a hydraulic lock.

Figure 14:
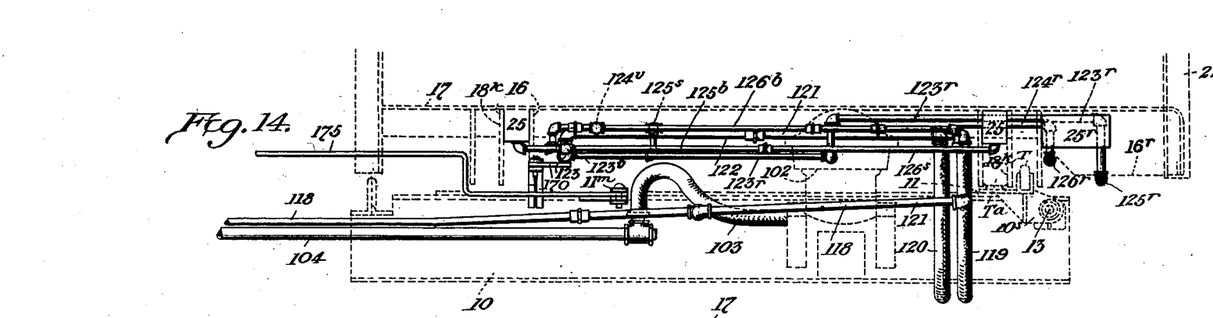
Figure 14 is a diagrammatic view of these connections, substantially in side elevation.

In Figures 13, 14, 15, 18 and 19, it will be noted that a cross brace 11m of the sub-frame 11 pivotally supports an operating lever 175 which projects forwardly from beneath the body. A transverse link 176 is pivotally connected at its ends to the handles 170 of the door-selecting valves 123 and 124 so that the two valves are moved together. The link 176 has downwardly extending arms 177 which fit over the handle 175 when the body is in its lower or transport position (Figures 14 and 15). Thus by movement of the handle 175, the two door-selecting valves 123, 124 may be moved simultaneously to the position shown in Figures 16b, 16c and 16d.

Figure 18:
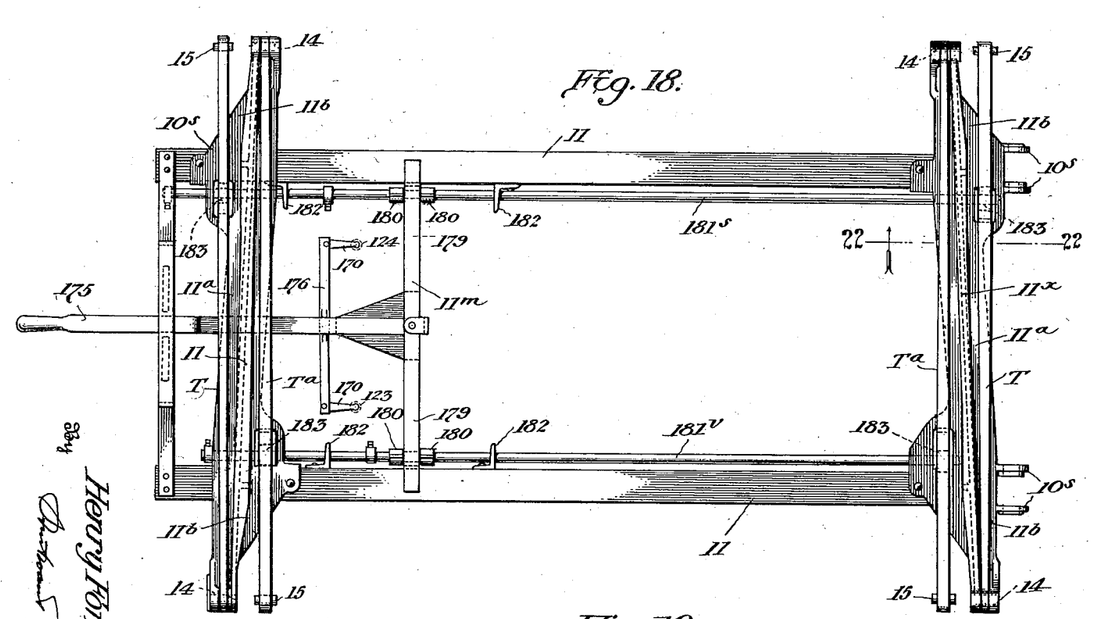
Figure 18 is a plan view of the sub frame.
Figure 19:
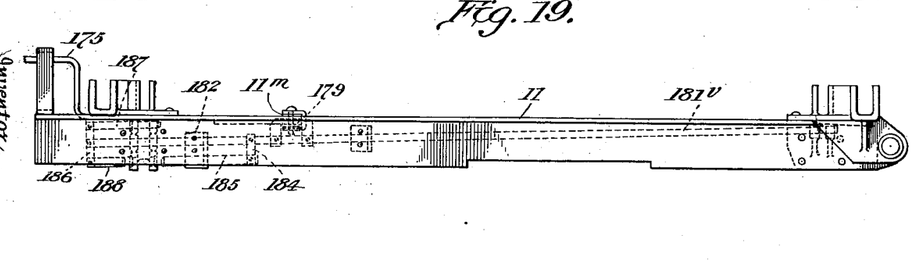
Figure 19 is a side elevation of the sub frame.
Figure 20:
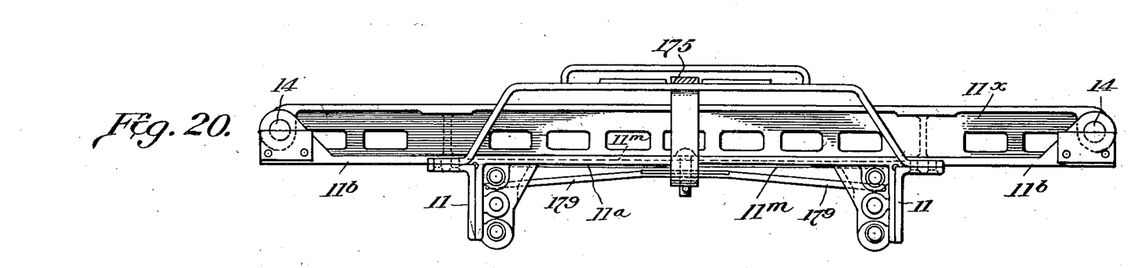
Figure 20 is an elevation of the front end of the sub frame.
Figures 21, 22:
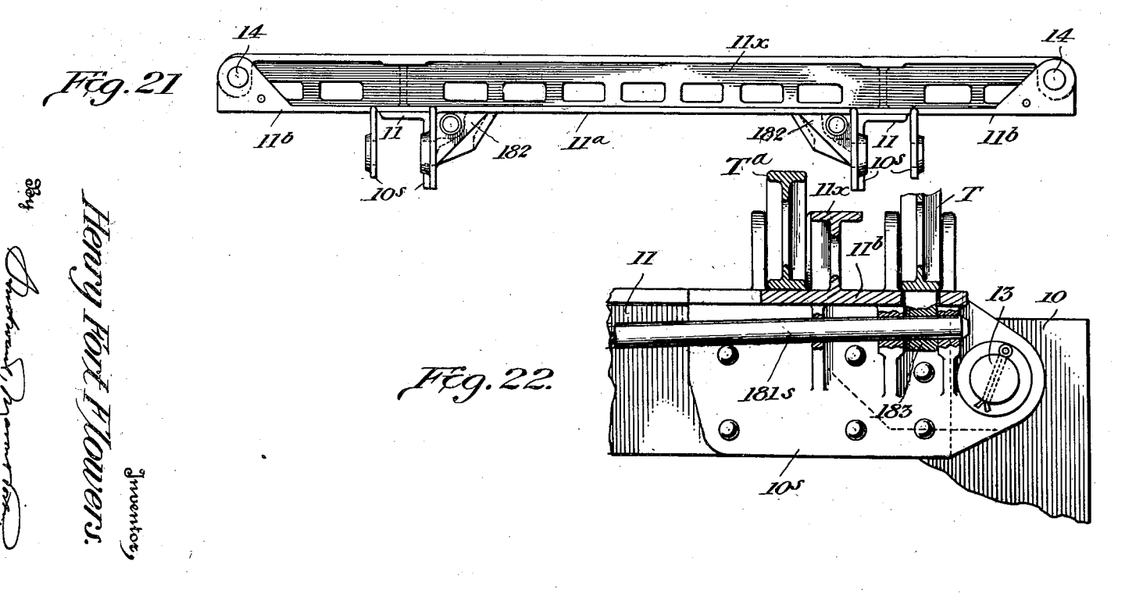
Figure 21 is an elevation of the rear end of the side frame.
Figure 22 is a section on the line 22—22 of Figure 18, on a larger scale.

The handle 175 has a triangular tie plate 178 joining it to the laterally and downwardly inclined arms 179 (Figures 15 and 18) which rest between the collar pieces 180 on the right hand and left hand latch rods 181b, 181s (Figure 18), so that as the lever 175 is swung the latch rods 181v, 181s are moved in opposite directions, being guided for this movement in the brackets 182 of the sub-frame beams 11 and the cross members 11a (Figures 18 and 22). Each transverse arm T, Ta has a downwardly extending lug 183 which passes through an aperture in the cross member 11a, 11b (Figure 22), so that it may be engaged by the latch rod. In Figure 22 the end of the latch rod 181s is shown engaged so that it holds the transverse arm T against movement with respect to the sub-frame members 11. The front end of the latch rod 181s is provided with a tie piece 184 to which is connected a further latch pin 185, while a second tie piece 186 supports the latch pins 187, 188. A similar arrangement is provided for the latch rod 181b. Such a latching system is described in my copending application Serial No. 253,104, filed February 9, 1928, to which reference is made for the connection and operation of such a device. In brief, the movement of the handle 175 upward in Figure 18 will produce a latching of the transverse arms T so that the body will tilt toward the right as shown in Figure 3, and at the same time the link 176 will control the door-selecting valves 123, 124 so that correspondingly the door 22 will be opened. When the lever 175 is in the central position as shown, both pairs of transverse arms T, Ta are latched and the body may only tilt toward the rear; while at the same time the door-selecting valves 123, 124 are in position for control of the rear door. When the lever 175 has been moved to a downward position in Figure 18, the transverse arms T, Ta are latched while the arms T are released and the body will tilt toward the left in Figure 3, and the door-selecting valves 123, 124 will select the left hand door 122 for opening.

When a side door is operated (Figures 8, 9 and 10), fluid pressure being admitted to the connection 125 and exhaust permitted through the connection 126, the plunger piston is moved toward the left so that the piston rod 29 pulls on pivot pin 30 and rocks the crank lever 31 in a counterclockwise direction about its pivot 32. The pivot 36 thus moves slightly inward under the compression from link 35 until the pins 32, 36 and 33 are in a straight line. The door 22 does not move during this phase of operation. Immediately thereafter the continued movement of crank lever 31 and the travel of pivot pin 36 in a circular arc as occasioned thereby, permits the link 35, which operates in compression, to move so that the depending door arm 34 follows the link 35 and the door 22 may open by gravity. If the door for any reason fails to open by gravity, the link 35 acts in tension to exert a positive opening pull upon the door. This movement continues to the position shown in Figure 10 in which the plunger piston 27 has reached the end of its scope and the ridge 40 of the door is seated on rail 39. This determines the maximum opened position of the door 22. It will be noted that by control of the fluid passing to and from the connections 125, 126, the door may be brought to a standstill at any intermediate position. Likewise, while the body and door is in the transport position of Figure 8, any shock such as occasioned by steam shovel striking the inner face of door 22, during loading, will result in a compressional movement of link 35 and a yielding of spring 38, so that the operating structure is not broken. Further, even though both connections 125, 126 were open to atmosphere, as by breakage of other pipes, the toggle formed by the crank lever 31 and link 35 will hold the door in closed position.

Figures 4, 4A, 4B:
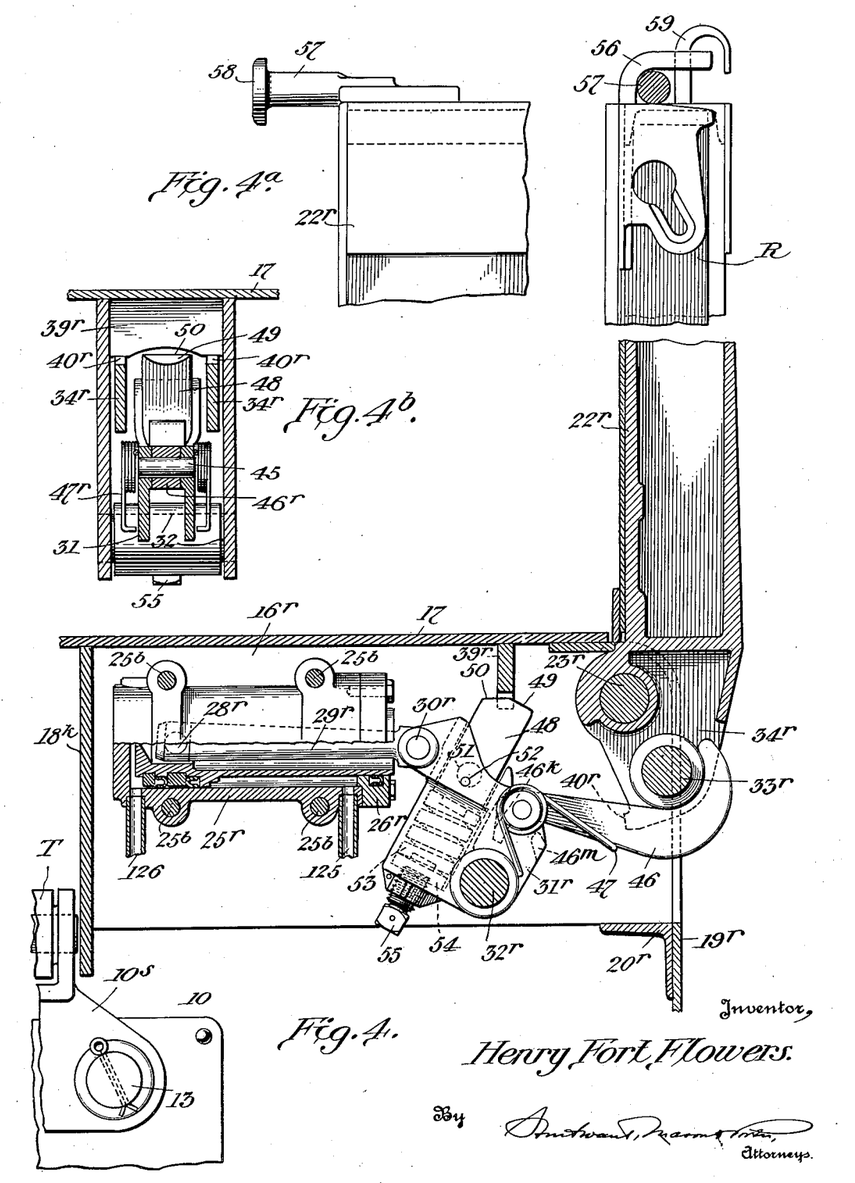
Figure 4 is a vertical longitudinal section, on a yet larger scale, showing the hydraulic control and actuating mechanism for the rear door.
Figure 4a is a detail view of a portion of the top edge of the rear door.
Figure 4b is a fragmentary section on line 4b—4b of Figure 6.
Figure 11:
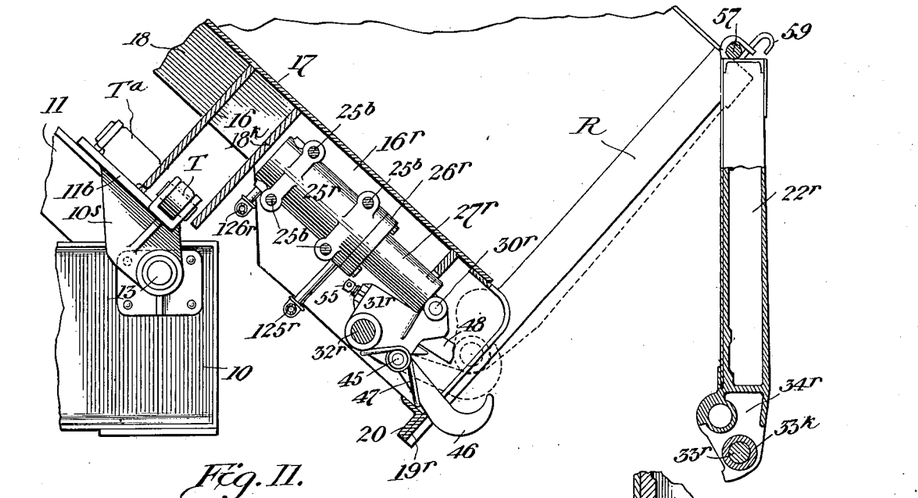
Figure 11 is a vertical longitudinal view showing the hydraulic control for the end door with the door swung open about its upper top.

Also with the rear door system, when the parts are in the transport position shown in Figure 4 with the lower pivot pins 23r in position and latch 59 engaged, the rear door is prevented from opening. If the latch 59 be removed and power delivered to the rear cylinder 25r (Figure 4), the crank lever 31r will be caused to move in a counterclockwise direction and carry with it the hook 46 so that the pin 33r is released, and the door 22r may be opened, either manually, by the pressure of a load against it, or by gravity as the body tilts about the rear sub-frame pivots 13 (Figure 11). If the rear door is stuck for any reason, the continued movement of the crank lever 31r will ultimately present the plunger 48 against the pin 33r (Figure 5) so that the plunger, through its spring 53, will exert an opening thrust upon the door to cause it to swing about its top pivot. Likewise, when fluid pressure is admitted through the connection 125 of the cylinder 25r, the piston is caused to return and the crank lever 31r to make a counterclockwise movement, so that the hook 46 (Figure 5) will move upward about the pivot 32r and engage the pin 33r and positively draw the rear door 22r into the closed position (Figure 4) in which the pivot pins 23r may be again engaged to lock the door closed.

Figure 5:
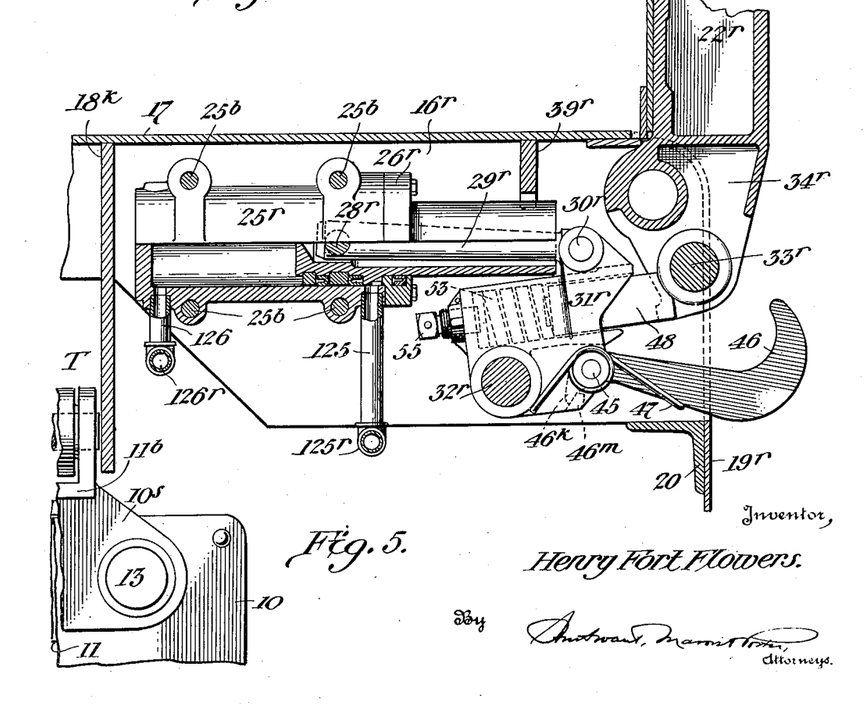
Figure 5 is a view corresponding to Figure 4, but showing the parts in another operated position.
Figure 6:
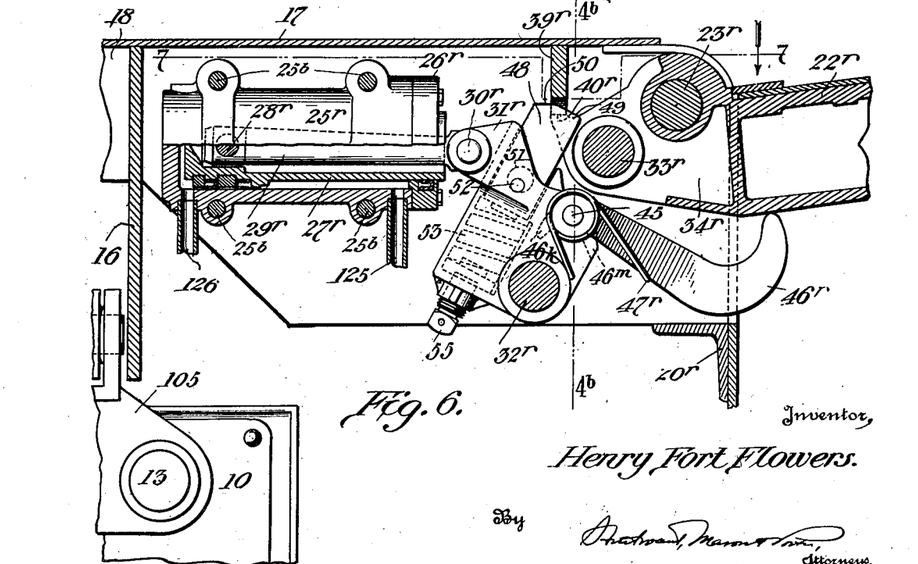
Figure 6 is a further view corresponding to Figures 4 and 5, and showing the parts in a third position.
Figure 7:
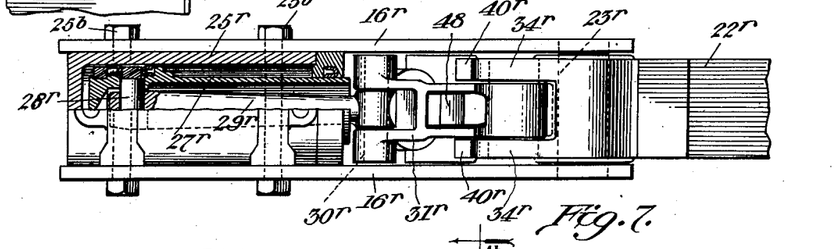
Figure 7 is a horizontal sectional view substantially on line 7—7 of Figure 6.
Figure 12:
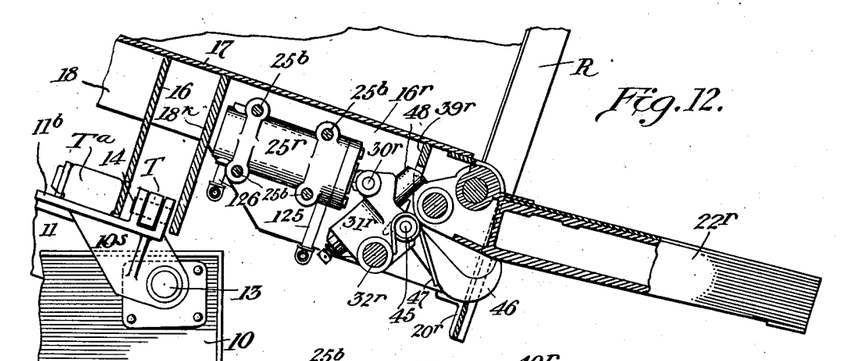
Figure 12 is a corresponding view, with the body tilted and the door swung open about its lower pivot.

When the pivot pins 23r are engaged and the latch 39 is in position, fluid pressure admitted to connection 126 with exhaust from connection 125 will cause the plunger 48 to move to the position shown in Figure 5. The latches 59 may now be removed and the direction of fluid flow in connection 125, 126 reversed, so that the piston moves back again. The door 22r may now open by gravity at a rate controlled by the receiving movement of the plunger 48 in front of it (Figure 12), so that the door 22r may pass to its open position (Figure 12). If the direction of flow through connections 125, 126 be again reversed, the crank lever 31r will again rock in a clockwise direction and plunger 48 by pressure upon the pin 33r will effect a positive closing of the rear door 22r until latch 59 may be again engaged to hold the rear door closed.

With the parts in the position of Figure 10, admission of fluid under pressure to connection 126 with exhaust from connection 125 will cause a clockwise movement of the crank lever 31, with a compression through link 35 which will cause the counter-clockwise movement of the open side door 22 until the latter attains its closed position and the parts are as shown in Figure 8.

It will particularly be noted that the doors are assured against breakage, both by the capability of the hydraulic unit of yielding, even though a vacuum be created during such yielding, and also by the provision of spring devices in the door connections. Thus in the form illustrated in Figures 8 to 10, when the door is closed and in the position of Figure 8, no breakage of the door or door parts will occur if the door 22 be struck on the inside surface, as by a steam shovel during loading, as the door may rock about its pivot 23 and by compression through the link 35 the spring 38 will absorb the movement. Therewith, also the center pivot is below the line of centers and the lock thus afforded is not broken.

I claim:

1. In a dump vehicle, a frame, a body tiltable at least to one side and one end with respect to said frame, side and end doors pivotally mounted on said body at the side and end, fluid operated means for controlling the opening and closing of said doors, and valve means for selecting the door to be opened and closed and to select the direction of actuation of said fluid operated means whereby to open or close the door.

2. In a dump vehicle, a frame, a body tiltable to either side with respect to said frame, side doors pivotally mounted on said body, fluid operated means for controlling the opening and closing of said doors, latches for holding said body to said frame, valve means for selectively governing the operation of said fluid operated means, and a control member for selectively operating said latches and valve means whereby to release the body for tilting in one direction and select one door for opening.

3. In a dump vehicle, a frame, a body tiltable to one side and to one end with respect to said frame, doors pivotally mounted on said body, fluid operated means for controlling the opening and closing of said doors, latches for holding said body to said frame, valves for selectively governing the operation of said fluid operated means for controlling the doors, and a control member for selectively operating said latches and valves in unison whereby to release the body for tilting in one direction and select one door for opening.

4. In a dump vehicle, a frame, a body tiltable with respect to said frame, mechanism for raising said body at an intermediate point thereof, latch devices for selectively holding peripheral portions of the body to said frame so that the body will tilt in a desired direction, doors pivotally mounted on said body, devices separate from said latch devices for controlling and selectively producing the opening and closing of said doors independently of the position of said body, and a common means for selecting said latch device and controlling devices so that the door adjacent the fulcrum about which the body can tilt is selected for opening movement.

5. In a dump vehicle, a frame, a body tiltable with respect to said frame, doors pivotally mounted on said body, fluid operated devices for controlling the opening and closing of said doors independently of the position of said body, and means for selecting the direction of tilting of said body and the actuation of said devices so that the door adjacent the fulcrum about which the body can tilt is selected for opening movement.

6. In a dump vehicle, the combination of a body, a door pivotally mounted on said body for downward opening movement by gravity and having an arm extending beyond the pivot, a double-acting fluid operated device and means to selectively energize the same by fluid pressure, and means actuated by said device and engageable with said arm to exert an opening force upon the door if stuck and to exert a closing force upon said door when open and to control the gravitational opening of the door.

7. In a dump vehicle, the combination of a tiltable body, a door pivotally mounted on the body for downward opening movement and having an arm extending beyond the pivot, a double-acting fluid pressure door operating device including a member movable back and forth by fluid pressure in said device, a rock lever connected to said member, a slide member carried by said rock lever, a link pivoted to said slide member and pivotally engaged with said arm, and a spring operating upon said slide member to hold said link under compression when the door is closed.

8. In a dump vehicle, the combination of a tiltable body, a door pivotally mounted on the body for downward opening movement and having an arm extending beyond the pivot, a double-acting fluid pressure door operating device including a member movable back and forth by fluid pressure in said device, a rock lever pivotally connected to said member, a link pivoted to said rock lever and pivotally engaged with said arm, means for limiting the rocking movement of said rock lever in one direction to a position slightly beyond the line of pivot centers of said rock lever and said link whereby to form a supported toggle for maintaining the door closed irrespective of the existence of fluid under pressure in said device, and means for permitting a relative movement of said link with respect to said rock lever in passing to and from said line of centers.

9. In a dump vehicle, a tiltable dump body, a door, top and bottom pivots which may be selectively engaged with said body and door so that the door may open by a swinging movement about either its upper or lower edge, and a fluid pressure operated device for moving said door into closed position whether it is pivoted for opening at its top or bottom.

10. In a dump vehicle, a tiltable dump body, a door, top and bottom pivots which may be selectively engaged so that the door may open by a swinging movement about either its upper or lower edge, and a fluid pressure operated device for exerting power upon said door to open it whether it is pivoted for opening at its top or bottom.

11. A vehicle as in claim 10, in which the fluid pressure actuated device includes a double-acting cylinder having a movable piston, a rock lever connected to said piston, a hook pivoted to said crank lever, and means at the lower edge of the door for engagement by said hook so that the said device may operate to draw the door into closed position when engaged for moving about its upper pivot.

12. A device as in claim 10, in which said device includes a double-acting cylinder having a movable piston, and means actuated by said piston for engaging the lower edge of said door to force the same open when engaged for moving about its upper pivot.

13. A vehicle as in claim 10, in which said device includes a double-acting cylinder having a moving piston, and means operated by said piston for imparting a thrust against the door below the lower pivotal mounting thereof whereby to close the door when supported on said lower pivot.

14. A vehicle as in claim 10, including a rock lever actuated by said device, a hook pivotally mounted on said rock lever, means on the lower end of the door for engagement by said hook, and a spring for rocking said hook into a door-engaging position.

15. A vehicle as in claim 10, including a rock lever actuated by said device, a plunger on said rock lever, a spring for urging said plunger outward, and means on said door engageable by said plunger whereby an opening force may be exerted upon said door when pivoted for moving about its upper edge and for exerting a closing force upon said door when pivoted at its lower edge.

16. In a dump vehicle, a tiltable dump body, a door, upper and lower pivots which may be selectively engaged with the body and door so that the door may open by a swinging movement about pivot axes adjacent its upper and lower edges, and a fluid pressure operated device including means for engaging said door at a part thereof which is below both of said pivot axes when the door is in closed position, whereby to control and produce opening and closing movements of said door.

17. In a dump vehicle, a frame, a dump body tiltable on said frame for dumping and including depending gusset plates adjacent its edge, a side door pivotally mounted adjacent its lower edge on pivots extending through said plates, a fluid pressure operated device located between and mounted upon said plates, and means connecting said fluid pressure device and said door whereby to control and produce the opening and closing movements of said door, said means and said devices being protected by said body bottom and plates.

18. In a dump vehicle, a frame, a sub-frame pivotally mounted to said frame at its rear end, a dump body pivotally mounted on said sub-frame for selective tilting movement toward either side, latching means for securing said dump body to said frame, doors pivotally mounted on said body, fluid pressure actuated devices for controlling and producing the opening and closing movements of said doors, door selector valves and conduits for delivering fluid pressure to and from said devices, and unitary means for moving said selector valves and said latches.

19. In dump vehicle construction, a frame, a body tiltable upon said frame, doors pivotally mounted on said body for downward opening movement, fluid operated means on said frame for tilting said body, independent fluid operated devices on said body for controlling the opening and closing movement of said doors, a source for supplying fluid under pressure, a valve for controlling the delivery of said fluid to and from said tilting means, a direction valve, door selector valve means, and pipe lines for connecting said source of supply and said valve means with said tilting means and fluid operated devices whereby said direction valve may determine the flow of fluid to and from the door selector valve means, and said door selector valve means may determine the door to be opened or closed.

20. A device as in claim 19 in which said selector valve means includes a pair of door selector valves coupled for simultaneous movement, and said pipe lines include a pair of pipe lines each of which leads from said direction valve to one of said selector valves, and pairs of pipe lines leading from said selector valves and each pair of which communicates with said fluid operated device for one door, whereby said selector valves will determine the flow of fluid to and from the devices for the selected door and cut off the flow to and from the other doors, and said direction valve will control the movement of fluid in one of said pipes to one selector valve and in the other of said pipes from the other selector valve.

21. A dump vehicle construction including a source of fluid under pressure, an exhaust connection, a direction valve connected to said source and to said exhaust, two lines extending from said direction valve which may be selectively connected to said source and said exhaust by said direction valve, two door selector valves each communicating with one of said lines, a tiltable dump body, a plurality of doors pivotally mounted on said dump body, independent double-acting fluid pressure operated devices for controlling the opening and closing of said doors, pipe lines from one of said door selector valves extending independently of one another to one end of each said device, and pipe lines extending independently of one another from other said door selector valve to the other end of each said device, whereby said direction valve will selectively control the opening and closing of a door, and said door selector valves will coordinately control the selection of the door to be actuated.

22. In a dump vehicle, a frame including first parallel longitudinal members, a sub-frame including second parallel longitudinal members adapted to rest on said first parallel longitudinal members, a horizontal transverse plate for connecting said second longitudinal members at the rear ends thereof and extending laterally beyond said members, pivots joined to said plate for mounting said sub-frame on said frame, an upstanding reinforcing web extending substantially transversely across the vehicle and connected to said plate, and aligned pivot mountings at the extreme ends of said plate and web.

23. In a dump vehicle, a frame, a body adapted to tilt about laterally spaced and rear fulcrums for dumping, side and rear doors pivotally mounted on said body, fluid pressure operated mechanism for raising said body and for opening and closing said doors, a source of fluid under pressure, and means connecting said source to said mechanism and including valve means for controlling said mechanism, and a single manually operable means for selectively controlling the direction of tilting of said body and selecting the door to be opened and closed and in operative connection with said valve means.

24. In a dump vehicle, a tiltable dump body, a door, top and bottom pivots which may be selectively engaged with said body and door so that the door may open by a swinging movement about either its upper or lower edge, said door including an extension beyond the bottom pivot point thereof, and a fluid pressure operated device engageable with said extension for moving the door into closed position whether it is pivoted for opening at its top or bottom.

25. In a dump vehicle, a frame, a body adapted to tilt about laterally spaced fulcrums, side doors pivotally mounted on said body, fluid pressure operated mechanisms on the body for opening and closing said doors, a source of fluid under pressure located on said frame, and conduit means connecting said pressure source on the frame to said door operating mechanisms on said tilting body and constructed and arranged to maintain the connection during relative tilting movements of the body and frame.

26. In a dump vehicle, a frame, a body tiltable with respect to said frame, doors pivotally mounted on said body, a source of fluid pressure on said frame, independent fluid operated means located on said body for controlling the opening and closing of said doors, and conduit means connecting the source of pressure on the frame to the door operating means on the body and including valve means for selecting between said fluid operated means, said conduit means being constructed and arranged to maintain the connection during relative tilting movements of the body and frame.

27. In a dump vehicle, a frame, a body tiltable with respect to said frame and including a floor, doors pivotally mounted on said body adjacent the floor for folding down for opening, a source of fluid pressure on said frame, fluid operated means carried by the body and positioned beneath the floor for controlling the closing of said doors, conduit means between the said source of pressure on the frame and said fluid operated means on the body and constructed and arranged to maintain the connection during relative tilting movements of the body and frame, and valve means for controlling the flow through said conduit means.

28. In a dump vehicle, a frame, a body tiltable with respect to said frame, mechanism for tilting the body including devices for selecting the direction of tilting, doors pivotally mounted on said body, fluid operated means for controlling the opening and closing of said doors, a source of fluid under pressure and conduit means therefrom to said fluid operated means, control valves on said conduit means for selecting the delivery of fluid medium to and from said fluid operated means, and means interlocking said valves with said mechanism for tilting the body so that the lower door upon tilting is selected for opening.

29. In a dump vehicle, a frame, a body on said frame adapted to tilt in at least two directions for dumping, doors pivotally mounted on said body, mechanism for selecting the direction for tilting, fluid operated means for controlling the opening and closing of said doors, valve means on the body for selectively controlling the delivery of fluid medium to and from said means, and means interlocking said valve with the selecting mechanism.

30. In a dump vehicle, a frame, a body adapted to tilt about laterally spaced fulcrums, side doors pivotally mounted on said body, fluid pressure operated mechanism for raising said body and for opening and closing said doors, a source of fluid under pressure and means connecting said source to said mechanism and including valve means for controlling said mechanism, and a manually operable means for selectively controlling the direction of tilting of said body and selecting the door to be opened and closed and in operative connection with said valve means.

31. In a dump vehicle, a frame, a body tiltable with respect to said frame, doors pivotally mounted on said body, a source of fluid pressure on said frame, independent fluid operated means located on the body for controlling the opening and closing of said doors, means selectively operable to control the direction of tilting, valve means located on the body and operatively connected to said selectively operable means for selecting the fluid operated means to be operated at a selected direction of tilting, a valve on the frame for controlling the opening and the closing of said doors by said fluid operated means, and conduits connecting said source, valve means, valve and fluid operated means and including yielding structure between said valve and valve means to permit the tilting of the body relative to the frame.

32. In a dump vehicle a frame, a body adapted to tilt transversely about laterally spaced fulcrums, an end door pivotally mounted on said body adapted to fold down for opening, fluid-pressure operated mechanism on the body for opening and closing said end door independently of the tilting of the body, a source of fluid pressure located on said frame, and conduit means connecting said pressure source on the frame to said door operating mechanism on the body and constructed and arranged to maintain the connection during relative tilting movement of the body and frame.

HENRY FORT FLOWERS.